(12) United States Patent
An et al.

(10) Patent No.: US 11,655,853 B2
(45) Date of Patent: May 23, 2023

(54) BEARING CAGE AND BEARING

(71) Applicant: Aktiebolaget SKF, Gothenburg (SE)

(72) Inventors: Hongyuan An, Shanghai (CN);
Riccardo Restivo, Turin (IT)

(73) Assignee: Aktiebolaget SKF

( * ) Notice: Subject to any disclaimer, the term of this patent is extended or adjusted under 35 U.S.C. 154(b) by 0 days.

(21) Appl. No.: 17/473,898

(22) Filed: Sep. 13, 2021

(65) Prior Publication Data

US 2022/0090632 A1    Mar. 24, 2022

(30) Foreign Application Priority Data

Sep. 18, 2020 (IT) .......................... 102020000021943

(51) Int. Cl.
*F16C 19/06* (2006.01)
*F16C 33/41* (2006.01)
*F16C 33/66* (2006.01)

(52) U.S. Cl.
CPC ............ *F16C 33/418* (2013.01); *F16C 19/06* (2013.01); *F16C 33/6614* (2013.01); *F16C 33/6629* (2013.01)

(58) Field of Classification Search
CPC ...... F16C 19/06; F16C 33/412; F16C 33/414; F16C 33/416; F16C 33/418; F16C 33/6614; F16C 33/6629
See application file for complete search history.

(56) References Cited

U.S. PATENT DOCUMENTS

2013/0022304 A1* 1/2013 Kawamura ........... F16C 33/416
                                                              384/470

FOREIGN PATENT DOCUMENTS

| CN | 107407333     | 11/2017 |           |
|----|---------------|---------|-----------|
| CN | 110714986     | 1/2020  |           |
| EP | 1956256       | 8/2008  |           |
| FR | 2911934       | 8/2008  |           |
| JP | H10213139 A * | 8/1998  |           |
| JP | H112248       | 1/1999  |           |
| JP | 2001082486    | 3/2001  |           |
| JP | 2002081450 A* | 3/2002  | ............ F16C 33/416 |

(Continued)

OTHER PUBLICATIONS

JP2012102760_Description.*

(Continued)

*Primary Examiner* — Phillip A Johnson
(74) *Attorney, Agent, or Firm* — Reed Smith LLP (57) ABSTRACT

The present disclosure provides a bearing cage and a bearing. The bearing cage comprising: a generally annular backbone portion having a front side and an opposite back side; a plurality of cantilever portions extending from the front side of the backbone portion in an axially forward direction of the bearing cage, the cantilever portions being arranged along a circumference of the annular backbone portion, defining a plurality of pockets bearing, wherein the backbone portion has a radial thickness which is larger than that of the plurality of cantilever portions. Each of the plurality of cantilever portions comprises two prong portions and a connection portion between the two prong portions. The bearing cage further comprises one or more of: a plurality of recesses formed in a radially outer side of the cantilever portions, and a plurality of grooves formed in the radially inner side of the bearing cage.

17 Claims, 8 Drawing Sheets

(56) References Cited

FOREIGN PATENT DOCUMENTS

| | | | | |
|---|---|---|---|---|
| JP | 2002349579 A | * | 12/2002 | ............ F16C 33/416 |
| JP | 2003232362 | | 8/2003 | |
| JP | 2007270990 | | 10/2007 | |
| JP | 2008274977 A | * | 11/2008 | ............ F16C 33/416 |
| JP | 2010060001 | | 3/2010 | |
| JP | 2012102760 A | * | 5/2012 | ............ F16C 33/416 |
| WO | WO-2010106173 A1 | * | 9/2010 | ............ F16C 33/416 |

OTHER PUBLICATIONS

Search Report for corresponding Italian Patent Application No. 102020000021943 dated May 27, 2021.
Search Report for corresponding French Patent Application No. 2108532 dated Sep. 22, 2022.

* cited by examiner

BEARING CAGE AND BEARING

CROSS-REFERENCE RELATED APPLICATIONS

This application is based on and claims priority to Italian Patent Application No. 102020000021943 filed on Sep. 18, 2020, under 35 U.S.C. § 119, the disclosure of which is incorporated by reference herein.

TECHNICAL FIELD

This disclosure relates in general to a cage for a ball bearing and a ball bearing comprising such a cage.

BACKGROUND ART

There exist ball bearings for use in a variety of industries.

BRIEF DESCRIPTION OF THE DRAWINGS

The disclosure can be better understood with reference to the flowing drawings and description. The components in the drawings are not necessarily to scale, emphasis instead being placed upon illustrating the principles of the disclosure. Moreover, in the figures, like reference numerals designate corresponding parts throughout the different views.

DETAILED DESCRIPTION

Hereinafter, embodiments of the present disclosure will be described in more detail with reference to the accompanying drawings. In the following description of the present disclosure, a detailed description of known functions and configurations incorporated herein will be omitted when it may make the subject matter of the present disclosure rather unclear.

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various elements, components, steps or calculations, these elements, components, steps or calculations should not be limited by these terms, rather these terms are only used to distinguish one element, component, step or calculation from another. For example, a first component could be termed a second component, similarly a first calculation could be termed a second calculation; similarly a first step could be termed a second step; all without departing from the scope of this disclosure.

As used herein, the terms "axis", "center axis", "rotation axis" refer to the axis about which the bearing rotates, the terms "radial", "radially", "radial direction" and their equivalents refer to the direction from the center or axis to the circumference of the bearing cage or bearing, the terms "axial", "axially", "axial direction" and their equivalents refer to the direction along the axis of the bearing or cage, i.e., the direction perpendicular to the radial direction or the circumference of the bearing cage or bearing, the terms "forward", "forwardly", "forward direction" refer to an axial direction to which the cantilever portion of the bearing cage points or the axial direction along which the cantilever portions extend from the backbone portion.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

A ball bearing, especially a deep groove ball bearing, is widely used due to its low rotational friction and high rotational speed performance. The present disclosure relates to a one-way snap-in bearing cage, and a deep groove ball bearing comprising such a bearing cage, for example a bearing cage and a bearing suitable for high rotation speed. A one-way snap-in cage has the advantage of low cost and easy installation and thus it is normally used with a ball bearing, especially a deep groove ball bearing.

A typical one-way snap-in cage comprises a generally annular backbone portion and a plurality of cantilever portions extending from one side of the backbone portion in an axial direction. The cantilever portions are spaced apart from one another along the circumference of the annular backbone portion, defining a plurality of pockets for accommodating rolling elements of the bearing.

A prior art snap-in cage has the following disadvantages: as the rotational speed increases, the cantilever portions flex radially outward as a result of an increased centrifugal force, resulting in a so-called umbrella effect. The umbrella effect deteriorates the matching relationship between the pockets and the rolling elements, resulting in an increased friction between the cage and the rolling elements, a deteriorated performance and/or failure of the bearing.

A proper lubrication is vital for a high performance of the bearing, and excess or insufficient grease will deteriorate the performance of the bearing.

There is always a need for a reduced umbrella effect and an improved lubrication for a bearing.

Figure 1A:
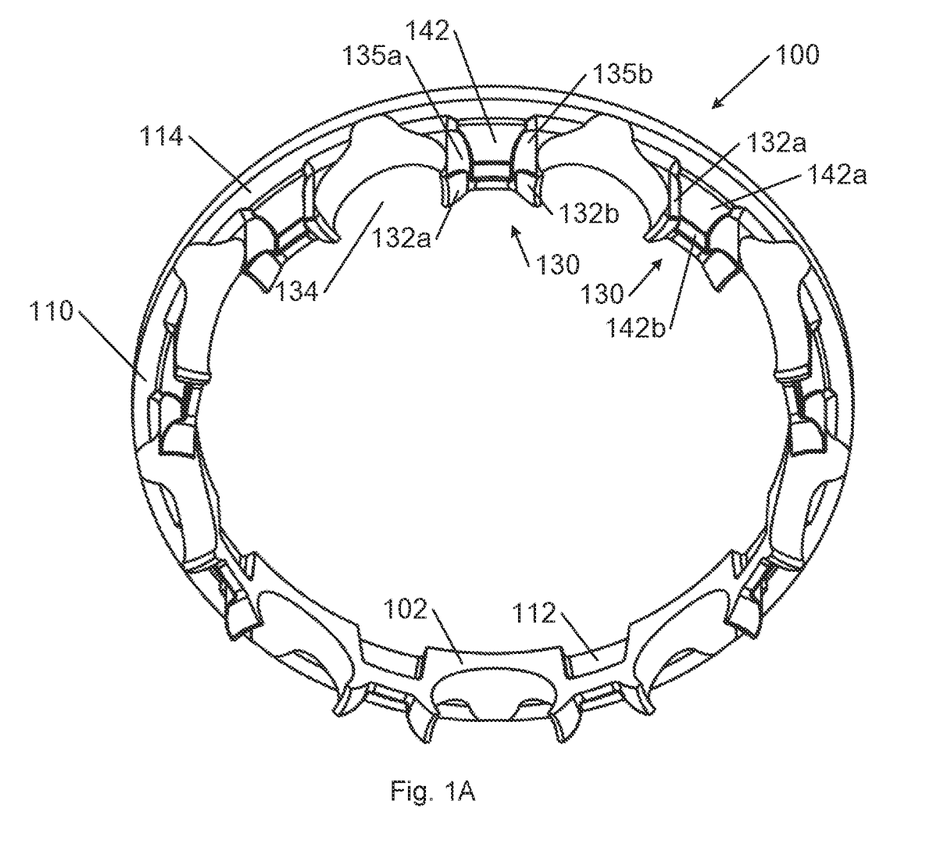
FIG. 1A shows a perspective view of a bearing cage according to some embodiments of the present disclosure.
Figure 1B:
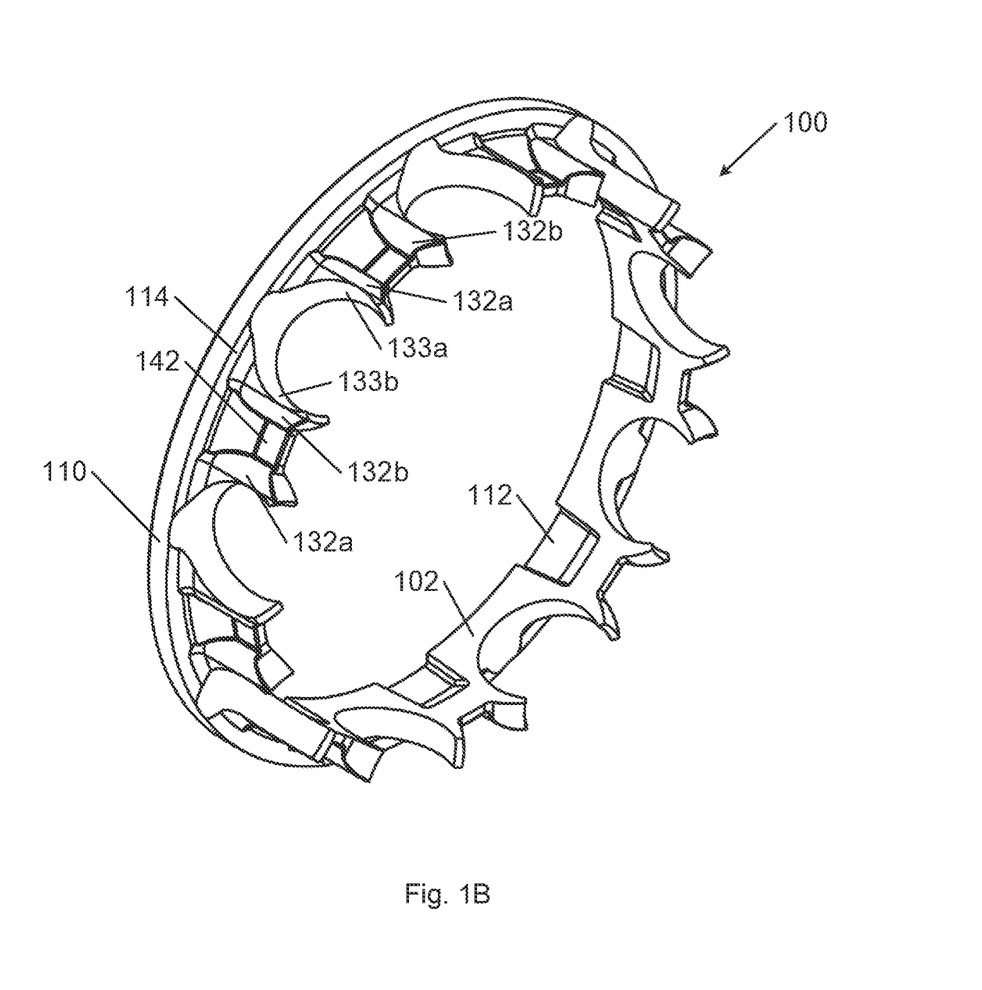
FIG. 1B and FIG. 1C show two perspective views of the bearing cage of FIG. 1A from different viewpoints.
Figure 1C:
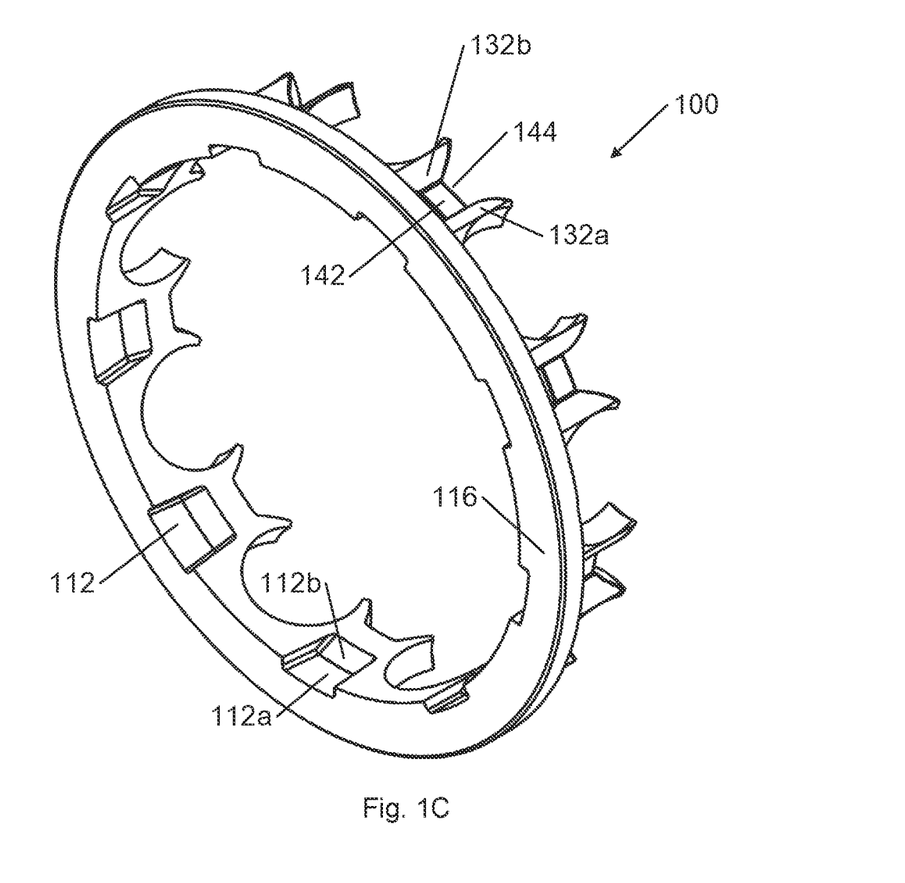
Figure 2:
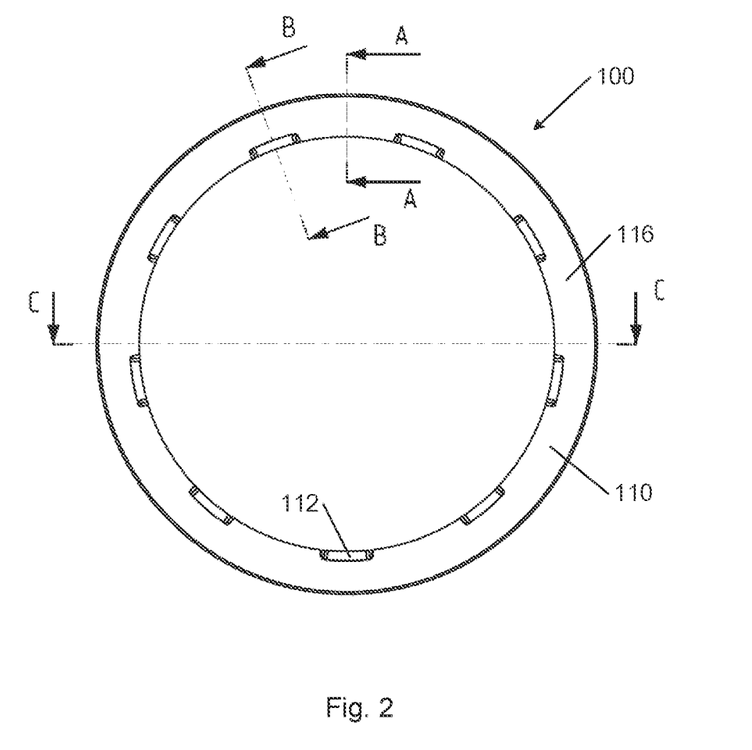
FIG. 2 shows a rear view of the bearing cage of FIG. 1A.
Figure 3:
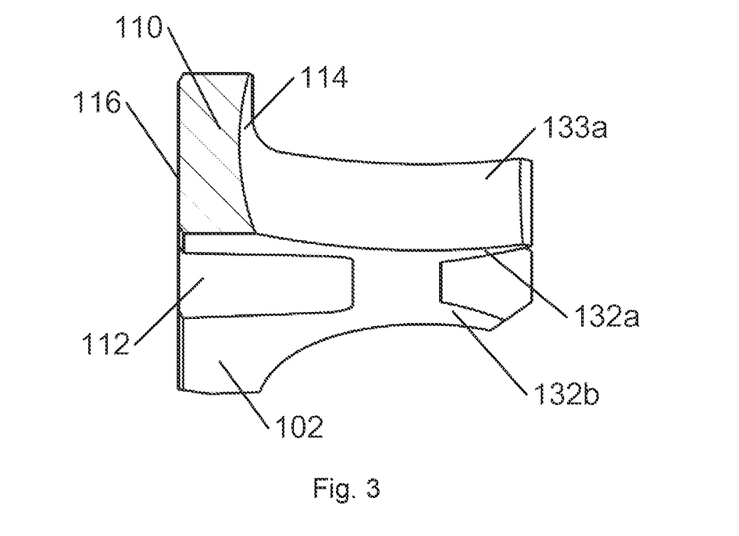
FIG. 3 is a sectional view taken along A-A line of FIG. 2.
Figure 4:
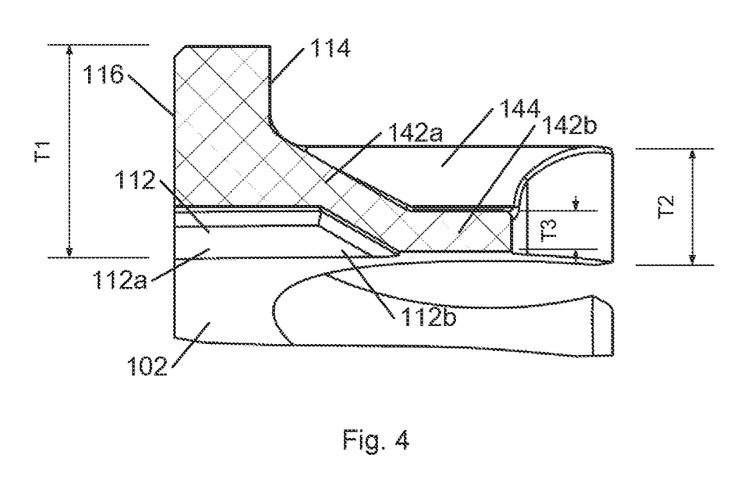
FIG. 4 is a sectional view taken along B-B line of FIG. 2.
Figure 5:
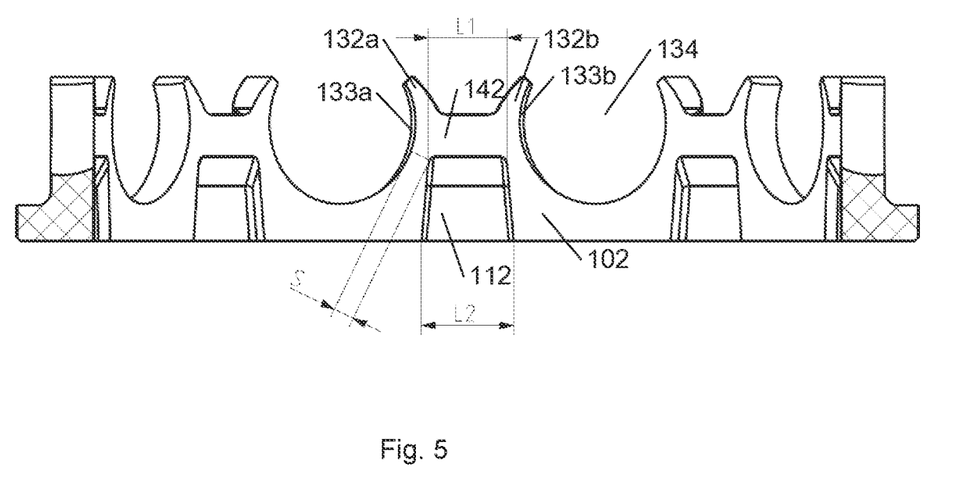
FIG. 5 is a sectional view taken along C-C line of FIG. 2.

FIGS. 1A-1C shows perspective views of a bearing cage 100 according to some embodiments of the present disclosure. FIG. 2 shows a rear view of the bearing cage 100 of FIG. 1A, FIG. 3 is a sectional view taken along A-A line of FIG. 2, while FIG. 4 is a sectional view taken along B-B line of FIG. 2. FIG. 5 is a sectional view taken along C-C line of FIG. 2.

As shown, the bearing cage 100 comprises a generally annular backbone portion 110 having a front side 114 and a back side 116 opposite to the front side 114, and a plurality of cantilever portions 130 extending from the front side 114 of the backbone portion in an axially forward direction of the bearing cage 100. As shown in FIGS. 1A-1C, the plurality of cantilever portions 130 are spaced from one another along the circumference of the annular backbone portion 110. In some embodiments, the plurality of cantilever portions 130 are equally spaced from one another along the circumference of the annular backbone portion 110.

As shown in FIGS. 1A-1C, 5, each of the cantilever portions 130 comprises two prong portions 132a, 132b and a connection portion 142 between the two prong portions 132a, 132b and connecting the two prong portions 132a, 132b together. Each of the prong portions 132a, 132b has a contacting surface 133a, 133b and a curved surface 135a, 135b facing away from the contacting surface 133a, 133b. Each of the contacting surface 133a, 133b of a prong portion 132a, 132b of a cantilever portion 130 faces a contacting surface 133a, 133b of a prong portion 132a, 132b of a neighboring cantilever portion 130. Two contacting surfaces 133a, 133b that face each other define a pocket 134 therebetween. Each of the pockets 134 functions to receive a rolling ball of the bearing and the contacting surfaces defining the pocket 134 will be in contact with the rolling ball received in the pocket. Each of the connection portions 142 is radially recessed from the two prong portions (i.e., the radially outer surface of the connection portion 142 has a smaller radial distance from the axis of the bearing cage than the radially outer surface of the two prong portions 132a, 132b), forming a recess 144 in a radially outer side of the cantilever portions 130. The recess 144 is defined by a radially outer surface of the connection portion 142 and the curved surfaces 135a, 135b of the cantilever portions 130 and is open in the axially forward direction or from axially forward side, as best shown in FIG. 1A, 4.

The recesses 144 can provide extra spaces for storing grease when there is excess grease in the bearing and can replenish the grease to the raceway when the grease in the raceway is insufficient. During the rotation of the bearing, the grease may flow from other parts of the bearing, such as the inner or outer raceways, into the recesses 144, and the grease may be more likely to flow into the recesses 144 when there is more grease in the bearing. Some of the grease flows into the recesses 144 may be temporarily stuck in the recesses 144. There will be a dynamic balance of the grease flowing into and out of the recesses 144, and the more grease there is in the bearing, the more grease there will be in the recesses 144 when a dynamic balance is reached. Thus, the recesses 144 can store grease when there is excess grease in the bearing and replenish the grease to the raceway of the bearing when the grease in the raceways of the bearing is insufficient. The recesses 144 can reduce or eliminate the technical problem related with excess grease. For example, the recesses 144 can reduce heat generated during acceleration and deceleration of the bearing which is resulted from strong shearing between grease and rotating parts, such as balls and the bearing cage, when there is excess grease in the bearing. That is, the recesses 144 can reduce or eliminate the heat generated due to grease churning.

As clearly shown in FIGS. 1A-1C, 3, 4, the backbone portion 110 has a radial thickness T1, which is larger than that of the cantilever portions 130. The radially inner surface of the backbone portion 110 and the radially inner surface of the cantilever portion 130 have a same radial distance from the axis of the bearing cage and thus they share a common radially inner surface 102. The radially outer surface of the backbone portion 110 has a larger radial distance from the axis of the bearing cage than that of the cantilever portions 130.

In the cantilever portion 130, the two prong portions 132a, 132b have a radial thickness T2, which is much larger than a radial thickness T3 of the connection portion 142. In addition, the prong portions 132a, 132b has a larger axial dimension such that they extend beyond the connection portion 142 in the axial direction, as shown in FIGS. 1A-1C, 4, 5.

The smaller radial distance from the axis of the bearing cage to the radially outer surface of the cantilever portions 130, i.e., the smaller outer diameter of the cantilever portions 130, as well as the reduced material due to the existence of the recesses 144 results in a reduced centrifugal force acting upon the cantilever portions 130. Therefore, the bearing cage has the technical advantage of reduced radially outward flex, that is, the so-called umbrella effect can be reduced or suppressed. The existence of the curved surfaces 135a, 135b can further reduce the material of the cantilever portions 130, and thus further reduce or suppress the so-called umbrella effect.

In some embodiments of the present disclosure, the annular backbone portion 110 has an increased radial thickness T1, which increases the structure strength of the bearing cage. In addition, as described in the present disclosure, the structure of the cantilever portions results in a reduced centrifugal force acting upon the cantilever portions 130. Therefore, the cage deformation, i.e., the so-called umbrella effect can be dramatically reduced or suppressed by the combination of the increased radial thickness T1 and the structure of the cantilever portions.

As shown in FIGS. 1A-1C, 2-5, the bearing cage 100 is provided with a plurality of grooves 112 formed in the radially inner side 102 of the bearing cage 100. In some embodiments of the present disclosure, the plurality of the grooves 112 are provided in one-to-one relationship with the plurality of cantilever portions 130. That is, there is one groove 112 corresponding to each of the plurality of cantilever portions 130. In some embodiments of the present disclosure, each of the plurality of grooves 112 is centered between two adjacent pockets in the circumferential direction. In some embodiments, each of the plurality of grooves is provided between two adjacent pockets in the circumferential direction.

As shown in FIG. 1A-1C, 2-5, the grooves 112 extend to the back side 116 of the annular backbone portion 110, such that grooves 112 form a portion of the back side 116 of the annular backbone portion. That is, the grooves 112 are open from the back side 116 of the annular backbone portion. Each of the grooves 112 comprises a first segment 112a adjacent to the back side 116 of the annular backbone portion 110 and a sloped second segment 112b away from the back side 116 of the annular backbone portion 110. As shown in FIG. 4, the first segment 112a has a flat bottom while the second segment 112b has a sloped bottom.

As shown in FIGS. 1A-1C, 2-5, each of the grooves 112 is centered between two adjacent pockets 134 (and thus centered between two adjacent rolling elements 190) in the circumferential direction, and the circumferential dimension of the grooves 112 spans a majority of the circumferential spacing between the two adjacent rolling elements 190. Since the groove 112 is positioned between two adjacent pockets 134 (rolling elements 190) and spans a majority of the circumferential spacing between the two adjacent pockets 134 (rolling elements 190), it provides an extra passage or widens the passage for the grease flow, e.g., the grease flow between the two rolling elements 190, facilitating a smooth flow of the grease between the two rolling elements 190 and thus improve the smooth flow of the grease in the space between the inner ring and the bearing cage, during the rotation of the bearing. Moreover, the grooves 112 can reduce or eliminate the technical problem related with excess grease. For example, the grooves 112 can reduce heat generated during acceleration and deceleration of the bearing which is resulted from strong shearing between grease and rotating parts, such as balls and cage. That is, the grooves 112 can reduce the heat generated due to grease churning. In some embodiments of the present disclosure, the grease filing quantity or amount is carefully chosen or adjusted and/or a special grease is used to improve the lubrication, so as reducing the heat generated due to grease churning.

During the rotation of the bearing, the grease may flow from the inner raceway to the grooves 112, and the grease may be more likely to flow into the grooves when there is excess grease in the inner raceway of the bearing. Some of the grease flows into the groove 112 may be temporarily stuck in the groove and some of the grease may flow back to the inner raceway. There will be a dynamic balance of the grease flowing into and out of the grooves 112, and the more grease there is in the inner raceway, the more grease there will be in the grooves 112 when a dynamic balance is reached. That is, the grooves 112 can provide extra spaces for storing grease when there is excess grease in the raceway. On the other hand, the grooves can replenish the grease to the raceway when the grease in the raceways is insufficient.

In some embodiments of the present disclosure, the annular backbone portion 110 has an increased radial thickness T1. In some embodiment of the present disclosure, the gap between the annular backbone portion 110 and the inner ring 170 may be reduced due to the increased radial thickness T1. Although the gap between the annular backbone portion 110 and the inner ring 170 is reduced, the grease in the inner raceway can still flow smoothly due to the existence of the grooves 112 between two adjacent rolling elements 190. That is, the structure strength of the backbone portion 110 can be improved (due to the increased radial thickness T1) without compromising the lubrication of the bearing.

The segments of the bearing cage having a cantilever portion normally contain more material and have a larger structure strength than the segments of the bearing cage having a pocket. As compared to conventional bearing cages, the bearing cage of the present disclosure has a less material in segments of the bearing cage having a cantilever portion due to the existence of the grooves 112 and/or recesses 142. Thus, the bearing cage of the present disclosure has a more even mass and structural strength distribution along the circumference of the bearing cage.

As described above, the bearing cage 100 has an increased overall structural strength and thus a reduced umbrella effect under high speed rotation due to the structure of the bearing cage. In the prior art, the prong portion may be prone to crack during cage mounting if the bearing cage has an increased structural strength for suppressing or reducing the umbrella effect, and thus the prior art bearing cage cannot have a too strong structural strength so as to reduce the risk of crack of the prong portion.

Testing of the present disclosure has shown that the existence of the grooves 112 can reduce the risk of the cage crack during the cage mounting. Particularly, the smallest distance S between the grooves 112 and the contacting surfaces 133a, 133b, as shown in FIG. 5, is a vital factor that may influence the risk of the cage crack and an optimal distance S can greatly reduce the risk of the cage crack during the cage mounting. That is, the bearing cage of the present disclosure can have an increased structural strength for suppressing or reducing the umbrella effect, while the risk of the cage crack during the cage mounting still remaining low.

Figure 7:
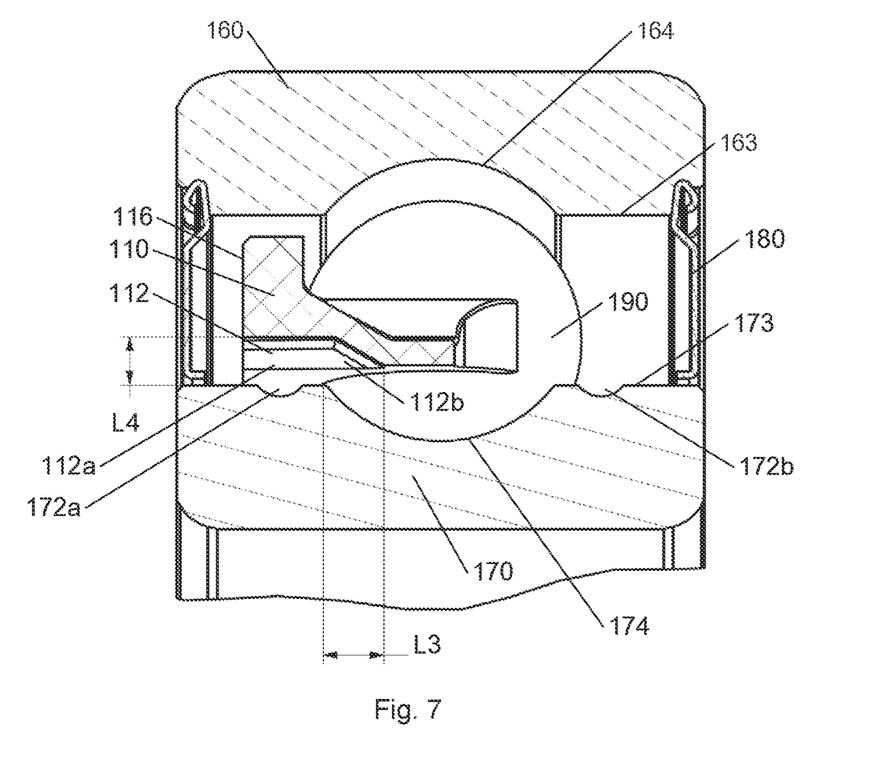
FIG. 7 is an enlarged view of the circled portion of FIG. 6.

Moreover, dimensions related to the grooves 112, i.e., L1, L2 shown in FIG. 5, L3, L4 shown in FIG. 7, can be carefully chosen or optimized to provide an optimal or best technical effects described above relating to the grooves 112. As shown in FIG. 5, the groove 112 has a generally trapezoid shape when viewed in a radial direction. The generally trapezoid shape has a bottom edge in the back side 116 of the backbone portion 110 and a top edge away from the back side 116 of the backbone portion 110. The length L1 of the top edge of the trapezoid shape and the length L2 of the edge of the trapezoid shape are important factors that may influence the technical effects related to the grooves 112. As shown in FIG. 7, the bottom of the first segment 112a of the groove 112 is spaced from the outer diameter surface 173 of the inner ring 170 by a distance L4. A portion of the groove 112 extends over the raceway 174 in the outer diameter surface 173 of the inner ring 170, and have an axial dimension of L3, i.e., the axial distance between the side of the raceway 174 and the end of the second segment 112b of the groove 112. The distance L4 and dimension L3 are also important factors that may influence the technical effects of the grooves.

In some embodiments of the present disclosure, L1, L2 are defined as follows:

$$PI*dc/(Z*4) <= L2 <= PI*dc/(Z*2);$$

$$L1 <= L2,$$

wherein dc is the diameter of the cage bore, and Z is the number of the rolling elements (rolling balls) in the bearing.

In some embodiments of the present disclosure, L3, L4 are defined as follows:

$$L3>0;$$

$$L4/Dw>0.08,$$

wherein Dw is the diameter of the rolling elements (rolling balls).

In some further embodiments of the present disclosure, L4/Dw>0.12. In some still further embodiments of the present disclosure, L4/Dw>0.16.

Figure 6:
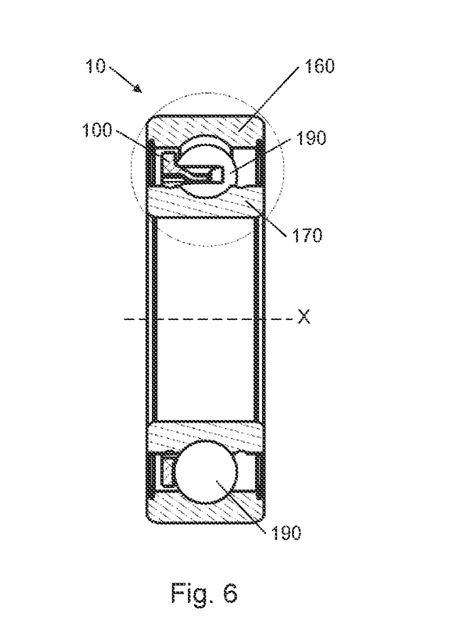
FIG. 6 is a sectional view of a ball bearing comprising a bearing cage.

FIG. 6 shows a sectional view of a ball bearing 10 comprising a bearing cage 100. FIG. 7 shows an enlarged view of the circled portion of FIG. 6. The ball bearing 10 comprises an inner ring 170; an outer ring 160; a plurality of rolling elements 190 disposed between in the inner ring 170 and the outer ring 160, and a bearing cage 100, the bearing cage being positioned between the inner ring and the outer ring, each of the plurality of rolling elements being received in one of the plurality of pockets of the cage; and a pair of sealing member 180 configured to seal an annular space formed between the inner ring 170 and the outer ring 160. The ball bearing comprises an axial x, about which the ball bearing rotates when operating. The axial x shown in FIG. 6 is also the axis of the bearing cage 100. As best shown in FIG. 7, the inner ring 170 comprises an outer diameter surface 173 and a raceway 174 formed in the outer diameter surface 173, the outer ring 160 comprises an inner diameter surface 163 and a raceway 164 formed in the inner diameter surface 163. The inner ring 170 further comprises two circumferential grooves 172*a*, 172*b* formed in the outer diameter surface 173 of the inner ring 170. Each of the two circumferential grooves 172*a*, 172*b* is provided at one side of the raceway 174. The circumferential grooves 172*a*, 172*b* can store excess grease and replenish the grease to the raceways of the bearing when the grease in the raceways of the bearing is insufficient, similar to the grooves 112 and recesses 144 as described above. As clearly shown in FIG. 7, the grooves 112 has a much larger axial span than that of the circumferential groove 172*a*, and the circumferential groove 172*a*, 172*b* is positioned within the axial span of the grooves 112 in the axial direction. In some embodiments, the grooves 112 at least partially overlap with the circumferential groove 172*a* in the axial direction. By means of such configuration, the grease stored in circumferential groove 172*a* can easily return to the raceway 174 via the grooves 112.

In some embodiment of the present disclosure, the bearing cage is a one-way snap-in bearing cage and the ball bearing is a deep groove ball bearing.

In the embodiments shown in FIGS. 1A-1C, 2-5, the grooves 112 are provided in one-to-one relationship with the plurality of cantilever portions 130. However, the present disclosure is not limited thereto, and in some embodiments of the present disclosure, the bearing cage of the present disclosure may not include any groove 112.

In the embodiments shown in FIGS. 6-7, the bearing of the present disclosure comprises two circumferential grooves 172*a*, 172*b* in the outer diameter surface 173 of the inner ring 170. However, the present disclosure is not limited thereto and in some embodiments, the bearing of the present disclosure may include only one circumferential groove or more than two circumferential grooves. In some embodiments, the bearing of the present disclosure may not include any circumferential groove at all.

In the embodiments shown, both of the grooves 112 and the recesses 142 has a two-segment configuration. However, the present disclosure is not limited thereto and in some embodiments, the grooves 112 and/or the recesses 142 may include any other suitable configuration, such as a smooth curve surface.

In the embodiments shown, the plurality of cantilever portions are spaced from one another along the circumference of the annular backbone portion, and in embodiments may be equally spaced from one another. However, the present disclosure is not limited thereto and may include any other suitable configuration. In some embodiments, the plurality of cantilever portions are spaced from one another along the circumference of the annular backbone portion. In some other embodiments, the plurality of cantilever portions are arranged along the circumference of the annular backbone portion.

Figure 8:
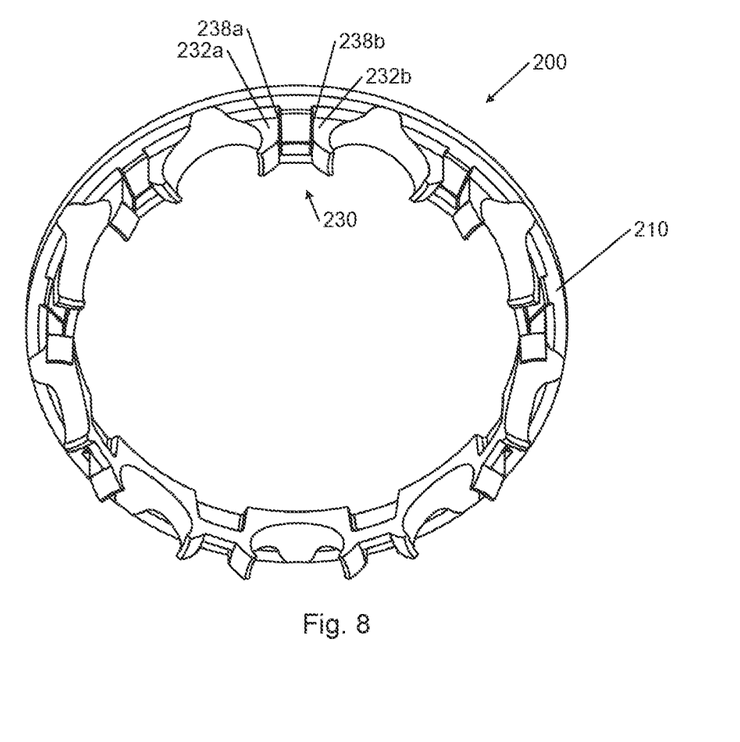
FIG. 8 is a perspective view of a bearing cage according to another embodiment of the present disclosure.

FIG. 8 is a perspective view of a bearing cage 200 according to another embodiment of the present disclosure. The bearing cage 200 comprises a generally annular backbone portion 210 and a plurality of cantilever portions 230. Each of the cantilever portions 230 comprises two prong portions 232*a*, 232*b* and a connection portion 242 between the two prong portions 232*a*, 232*b* and connecting the two prong portions 232*a*, 232*b* together. The bearing cage 200 is similar to the bearing cage 100 shown in FIGS. 1A-1C, except chamfers 238*a*, 238*b* formed on the prong portions 232*a*, 232*b*. The chamfers 238*a*, 238*b* are formed on the surfaces of the prong portions 232*a*, 232*b* opposite to the pockets defined by the prong portions. The bearing cage 200 has the technical advantage of reduced weight of the cantilever portions 230, and thus the so-called umbrella effect can be further reduced or suppressed in the bearing cage 200.

Figure 9A:
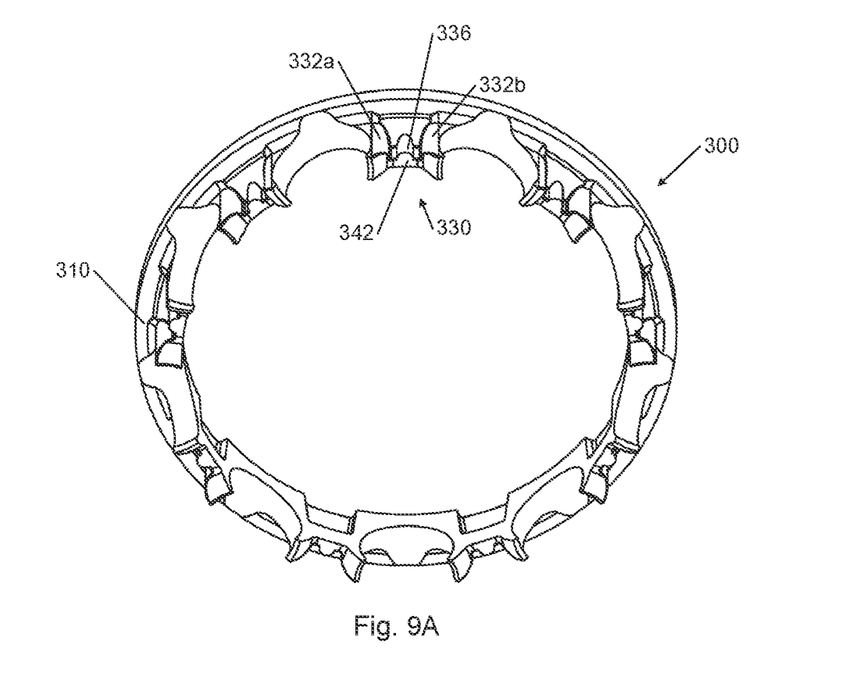
FIG. 9A and 9B are perspective view of a bearing cage according to still another embodiment of the present disclosure.
Figure 9B:
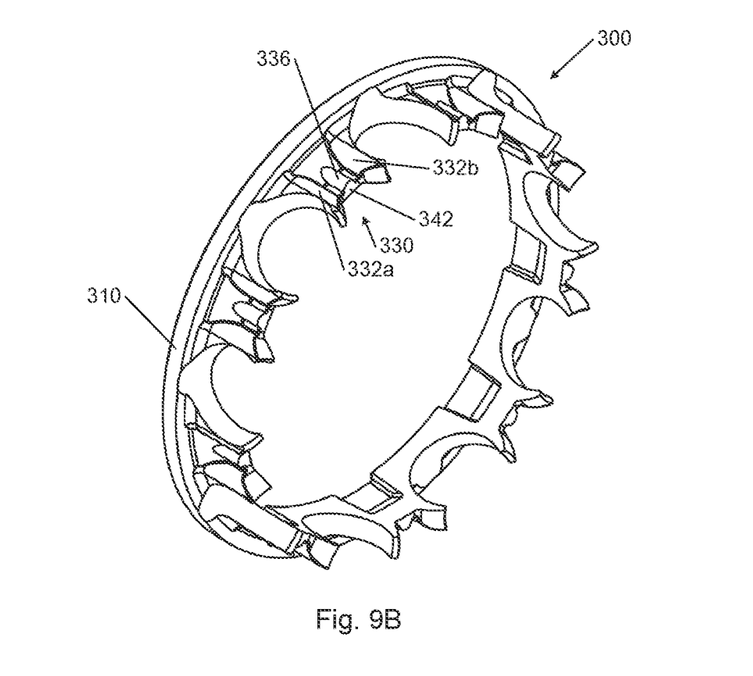

FIG. 9A and 9B are perspective views of a bearing cage 300 according to still another embodiment of the present disclosure. The bearing cage 300 comprises a generally annular backbone portion 310 and a plurality of cantilever portions 330. Each of the cantilever portions 330 comprises two prong portions 332*a*, 332*b* and a connection portion 342 between the two prong portions 332*a*, 332*b* and connecting the two prong portions 332*a*, 332*b* together. The bearing cage 300 is similar to the bearing cage 100 shown in FIGS. 1A-1C, except an axial projection 336 formed on the radially outer surface of the connection portion 342. The bearing cage 300 has the technical advantage of improved structural strength of the cantilever portions 330 due to the existence of the axial projection 336.

In view of the foregoing, the example embodiments of the present disclosure have been provided. According to one aspect of the disclosure, a bearing cage for a ball bearing is provided, the bearing cage comprising: a generally annular backbone portion having a front side and an opposite back side; a plurality of cantilever portions extending from the front side of the backbone portion in an axially forward direction of the bearing cage, the cantilever portions being arranged along a circumference of the annular backbone portion, defining a plurality of pockets for accommodating rolling elements of the bearing, wherein the backbone portion has a radial thickness which is larger than that of the plurality of cantilever portions, wherein each of the plurality of cantilever portions comprises two prong portions and a connection portion between the two prong portions, wherein the bearing cage further comprises at least one of the followings: a plurality of recesses formed in a radially outer side of the cantilever portions, each of the recesses being defined by a connection portion recessed from associated two prong portions, the recess being open from the axially forward side of the bearing cage; a plurality of grooves formed in the radially inner side of the bearing cage.

In some embodiments of the present disclosure, the backbone portion has an outer diameter larger than that of the plurality of cantilever portions.

In some embodiments of the present disclosure, the two prong portions have a radial thickness which is larger than that of the connection portion, the prong portions extend beyond the connection portion in the axially forward direction.

In some embodiments of the present disclosure, the connection portion comprises a first segment which is adjacent to the backbone portion and extends inclined relative to an axis of the bearing cage, and a second segment which is away from the backbone portion and substantially parallel to the axis of the bearing cage.

In some embodiments of the present disclosure, each of the prong portions comprises a contacting surface defining the pockets and a curved surface facing away from the contacting surface, wherein the recess is defined by a radially outer surface of the connection portion and the curved surface.

In some embodiments of the present disclosure, each of the plurality of grooves being positioned between two adjacent pockets in the circumferential direction.

In some embodiments of the present disclosure, each of the plurality of grooves is positioned in one-to-one relationship with the plurality of cantilever portions, and each of the plurality of grooves is centered between two adjacent pockets in the circumferential direction.

In some embodiments of the present disclosure, each of the grooves extends to the back side of the annular backbone portion and forms a portion of the back side of the annular backbone portion, each of the grooves comprises a first segment adjacent to the back side of the annular backbone portion and a sloped second segment away from the back side of the annular backbone portion, the first segment having a constant radial depth and the second sloped segment having a decreasing depth in the direction away from the back side of the annular backbone portion.

In some embodiments of the present disclosure, each of the grooves has a generally trapezoid shape comprising a bottom edge in the back side of the backbone portion and a top edge away from the back side of the backbone portion, wherein $$PI*dc/(Z*4)<=L2<=PI*dc/(Z*2),$$

$$L1<=L2,$$

wherein L1 is a length of the top edge of the trapezoid shape, L2 is a length of the bottom edge of the trapezoid shape, dc is an inner diameter of the bearing cage, and Z is the number of the rolling elements in the bearing.

In some embodiments of the present disclosure, there are chamfers formed on the surfaces of the prong portions opposite to the pockets defined by the prong portions.

In some embodiments of the present disclosure, the cantilever portions of the bearing cage further comprises an axial projection formed on a radially outer surface of the connection portion.

According to another aspect of the disclosure, a ball bearing is provided, comprising: an inner ring; an outer ring; a plurality of rolling elements disposed between in the inner ring and the outer ring; and a bearing cage of any of the preceding claims, the bearing cage being positioned between the inner ring and the outer ring, each of the plurality of rolling elements being received in one of the plurality of pockets.

In some embodiments of the present disclosure, the inner ring comprises a raceway for receiving the plurality of the rolling elements and at least one circumferential groove in an outer diameter surface of the inner ring, with one of the at least one circumferential groove at least partially overlapping with the grooves in an axial direction of the ball bearing.

In some embodiments of the present disclosure, the inner ring comprises two circumferential grooves in the outer diameter surface of the inner ring, with the raceway being positioned between the two circumferential grooves.

In some embodiments of the present disclosure, a portion of the groove extends over the raceway, and has an axial dimension of L3, and a bottom of the groove is spaced from the outer diameter surface by a distance L4, wherein $$L3>0,$$

$$L4/Dw>0.08,$$

wherein Dw is a diameter of the rolling elements. In certain embodiments, L4/Dw>0.12 and in other embodiments L4/Dw>0.16, Others systems, method, features and advantages of the disclosure will be, or will become, apparent to one with skill in the art upon examination of the following figures and detailed description. It is intended that all such additional systems, methods, features and advantages be included within this description, be within the scope of the disclosure, and be protected by the following claims.

Systems and methods have been described in general terms as an aid to understanding details of the embodiments of the disclosure. In some instances, well-known structures, materials, and/or operations have not been specifically shown or described in detail to avoid obscuring aspects of the disclosure. In other instances, specific details have been given in order to provide a thorough understanding of the disclsoure. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention. Accordingly, the disclosure is not to be restricted except in light of the attached claims and their equivalents.

The invention claimed is:

1. A bearing cage for a ball bearing, comprising:
an annular backbone portion comprising a front side and an opposite back side;
a plurality of cantilever portions extending from the front side of the backbone portion in an axially forward direction of the bearing cage, the plurality of cantilever portions arranged along a circumference of the annular backbone portion and defining a plurality of pockets for accommodating rolling elements of the bearing, wherein each of the plurality of cantilever portions comprises two prong portions and a connection portion between the two prong portions; and
a plurality of grooves formed in a radially inner side of the bearing cage,
wherein,
the backbone portion comprises a radial thickness which is larger than a radial thickness of each of the cantilever portions of the plurality of cantilever portions, and
the connection portion comprises:
a first segment adjacent to the backbone portion and extending in an inclined direction relative to an axis of the bearing cage; and
a second segment away from the backbone portion and substantially parallel to the axis of the bearing cage.

2. The bearing cage of claim 1, wherein the backbone portion includes an outer diameter larger than an outer diameter of the plurality of cantilever portions.

3. The bearing cage of claim 1, wherein the two prong portions comprise a radial thickness larger than a radial thickness of the connection portion, the two prong portions extending beyond the connection portion in the axially forward direction.

4. The bearing cage of claim 1, wherein chamfers are formed on the surfaces of the prong portions opposite to the pockets defined by the prong portions.

5. The bearing cage of claim 1, wherein the cantilever portions of the bearing cage further comprise an axial projection formed on a radially outer surface of the connection portion.

6. A bearing cage for a ball bearing, comprising:
an annular backbone portion comprising a front side and an opposite back side;
a plurality of cantilever portions extending from the front side of the backbone portion in an axially forward direction of the bearing cage, the plurality of cantilever portions arranged along a circumference of the annular backbone portion and defining a plurality of pockets for accommodating rolling elements of the bearing, wherein each of the plurality of cantilever portions comprises two prong portions and a connection portion between the two prong portions; and a plurality of grooves formed in a radially inner side of the bearing cage, wherein the backbone portion comprises a radial thickness larger than a radial thickness of each cantilever portion of the plurality of cantilever portions, each of the plurality of grooves is positioned between two adjacent pockets in a circumferential direction, and each of the grooves extends to the back side of the annular backbone portion and forms a portion of the back side of the annular backbone portion, each of the grooves comprising:
- a first segment adjacent to the back side of the annular backbone portion and comprises a constant radial depth; and
- a sloped second segment away from the back side of the annular backbone portion and comprises a decreasing depth in the direction away from the back side of the annular backbone portion.

7. The bearing cage of claim 6, wherein each of the plurality of grooves is positioned in a one-to-one relationship with the plurality of cantilever portions, and each of the plurality of grooves is centered between two adjacent pockets in the circumferential direction.

8. A ball bearing, comprising:
an inner ring;
an outer ring;
a plurality of rolling elements disposed between the inner ring and the outer ring, the inner ring comprising a raceway for receiving the plurality of rolling elements; and
- a bearing cage positioned between the inner ring and the outer ring, the bearing cage comprising:
  - an annular backbone portion having a front side and an opposite back side;
  - a plurality of cantilever portions extending from the front side of the backbone portion in an axially forward direction of the bearing cage, the plurality of cantilever portions arranged along a circumference of the annular backbone portion and defining a plurality of pockets for accommodating rolling elements of the bearing, wherein each of the plurality of cantilever portions comprises two prong portions and a connection portion between the two prong portions; and
  - a plurality of grooves formed in the radially inner side of the bearing cage,
    - wherein each of the plurality of rolling elements is received in one of the plurality of pockets,
    - the backbone portion has a radial thickness larger than a radial thickness of each cantilever portion of the plurality of cantilever portions,
    - a portion of the groove of the bearing cage extends over the raceway and has an axial dimension of L3, and
    - a bottom of the groove of the bearing cage is spaced from an outer diameter surface of the inner ring by a distance L4,
    - wherein
      $L3>0$,
      $L4/Dw>0.08$, and
      Dw is a diameter of the rolling elements.

9. The ball bearing of claim 8, wherein $L4/Dw>0.12$.

10. The ball bearing of claim 8, wherein $L4/Dw>0.16$.

11. A ball bearing, comprising:
an inner ring;
an outer ring;
a plurality of rolling elements disposed between the inner ring and the outer ring, the inner ring comprising:
- a raceway for receiving the plurality of rolling elements; and
- at least one circumferential groove in an outer diameter surface of the inner ring, a bearing cage positioned between the inner ring and the outer ring, the bearing cage comprising:
  - a generally annular backbone portion comprising a front side and an opposite back side;
  - a plurality of cantilever portions extending from the front side of the backbone portion in an axially forward direction of the bearing cage, the plurality of cantilever portions arranged along a circumference of the annular backbone portion and defining a plurality of pockets for accommodating rolling elements of the bearing, wherein each of the plurality of cantilever portions comprises two prong portions and a connection portion between the two prong portions; and
  - a plurality of grooves formed in the radially inner side of the bearing cage,
    wherein the backbone portion comprises a radial thickness larger than a radial thickness of each cantilever portion of the plurality of cantilever portions; and
  - one of the at least one circumferential grooves at least partially overlaps with the plurality of grooves of the bearing cage in an axial direction of the ball bearing.

12. The ball bearing of claim 11, wherein the inner ring comprises two circumferential grooves in the outer diameter surface of the inner ring, and the raceway is positioned between the two circumferential grooves.

13. A ball bearing, comprising:
an inner ring comprising a raceway and at least one circumferential groove in an outer diameter surface of the inner ring,
an outer ring;
a plurality of rolling elements disposed between in the inner ring and the outer ring; and
a bearing cage positioned between the inner ring and the outer ring, the bearing cage comprising:
- an annular backbone portion comprising a front side and an opposite back side,
- a plurality of cantilever portions extending from the front side of the backbone portion, the cantilever portions arranged along a circumference of the annular backbone portion and defining a plurality of pockets receiving the rolling elements, and
- a plurality of grooves formed in the radially inner side of the bearing cage,
wherein the at least one circumferential groove of the inner ring at least partially overlaps with the plurality of grooves of the bearing cage in an axial direction of the ball bearing, and
wherein a portion of the plurality of grooves of the bearing cage extends over the raceway and has an axial dimension of L3, and a bottom of the plurality of grooves of the bearing cage is spaced from the outer diameter surface by a distance L4, wherein $L3>0$, $L4/Dw>0.08$, wherein Dw is a diameter of the rolling elements.

14. The ball bearing of claim 13, wherein $L4/Dw>0.12$.

15. The bearing cage of claim 13, wherein each of the plurality of grooves comprises a generally trapezoid or rectangular shape comprising a bottom edge in the back side of the backbone portion and a top edge away from the back side of the backbone portion,
wherein $PI*dc/(Z*4)<=L2<=PI*dc/(Z*2)$, $L1<=L2$, wherein L1 is a length of the top edge of the trapezoid or rectangular shape, L2 is a length of the bottom edge of the trapezoid or rectangular shape, dc is an inner diameter of the bearing cage, and Z is the number of the rolling elements in the ball bearing.

16. A bearing cage for a ball bearing, comprising:
an annular backbone portion comprising a front side and an opposite back side;
a plurality of cantilever portions extending from the front side of the backbone portion in an axially forward direction of the bearing cage, the plurality of cantilever portions arranged along a circumference of the annular backbone portion and defining a plurality of pockets for accommodating rolling elements of the bearing, wherein each of the plurality of cantilever portions comprises two prong portions and a connection portion between the two prong portions;
a plurality of grooves formed in a radially inner side of the bearing cage; and
a plurality of recesses formed in a radially outer side of the cantilever portions, each recess being defined by the connection portion recessed from associated two prong portions, the recess being open from the axially forward side of the bearing cage,
wherein the backbone portion comprises a radial thickness larger than a radial thickness of each cantilever portion of the plurality of cantilever portions, and
each of the prong portions comprises:
a contacting surface defining each of the plurality of pockets; and
a curved surface facing away from the contacting surface, wherein each recess of the plurality of recesses is defined by a radially outer surface of the connection portion and the curved surface.

17. A bearing cage for a ball bearing, comprising:
an annular backbone portion comprising a front side and an opposite back side;
a plurality of cantilever portions extending from the front side of the backbone portion in an axially forward direction of the bearing cage, the plurality of cantilever portions arranged along a circumference of the annular backbone portion and defining a plurality of pockets for accommodating rolling elements of the bearing, wherein each of the plurality of cantilever portions comprises two prong portions and a connection portion between the two prong portions; and
a plurality of grooves formed in a radially inner side of the bearing cage,
wherein the backbone portion comprises a radial thickness larger than a radial thickness of the each cantilever portion of the plurality of cantilever portions,
each of the plurality of grooves has a generally trapezoidal or rectangular shape comprising a bottom edge in the back side of the backbone portion and a top edge away from the back side of the backbone portion,
wherein $PI*dc/(Z*4)<=L2<=PI*dc/(Z*2)$, and $L1<=L2$, wherein L1 is a length of the top edge of the trapezoidal or rectangular shape, L2 is a length of the bottom edge of the trapezoidal or rectangular shape, dc is an inner diameter of the bearing cage, and Z is a number of rolling elements in the ball bearing.

* * * * *